UNITED STATES PATENT OFFICE.

GEORGE I. ST. JOHN, OF BERKELEY, CALIFORNIA, ASSIGNOR TO HIMSELF AND FREDERICK F. CASSIDY, OF NEVADA CITY, CALIFORNIA, TRUSTEES.

PAINT OIL.

1,408,544.     Specification of Letters Patent.     Patented Mar. 7, 1922.

No Drawing.     Application filed April 22, 1920. Serial No. 375,771.

*To all whom it may concern:*

Be it known that I, GEORGE I. ST. JOHN, a citizen of the United States, residing at Berkeley, in the county of Alameda and State of California, have invented new and useful Improvements in Paint Oils, of which the following is a specification.

The primary object of this invention is to provide an improved paint oil or coating substance which may be made up of a relatively simple, inexpensive, and easily compounded mixture of ingredients, and which therefore, may be produced at a lower cost than paint oil now in use. The cost of manufacturing paints is greatly increased by the present cost of linseed oil particularly pure linseed oil. I have found that I can reduce the cost of manufacturing of paint by using a substitute for linseed oil, which is cheaper than linseed oil, and has approximately all of the desirable characteristics of linseed oil, for paint purposes.

By dissolving rubber gums or the like in an aromatic unsaturated hydrocarbon oil, I obtain an oily mixture which acts as a binder for paint pigments and when properly mixed with the ordinary paint ingredients will provide a cheap paint which is highly impervious to moisture.

The method of obtaining the aromatic unsaturated hydrocarbon oil is as follows:—

In the process of refining distillates from certain crude oils such as California asphaltic base crudes and other similar crudes, it is necessary to treat such distillates, especially illuminating oil, (kerosene) with strong sulfuric acid (known to the industries as fuming sulfuric acid), in order to remove the aromatic oil, (an unsaturated hydrocarbon which is detrimental to illuminating oil owing to its unsaturated nature which causes disagreeable odors and smoking). This unsaturated oil is soluble in the above mentioned sulfuric acid forming a sulfuric compound which is contained in the acid sludge from said treatment. This sludge being heavier than the distillates which are thus treated, settles to the bottom of treating apparatus, known in the art as agitators, and is drawn off through a lower valve and thereby separated from the distillate.

The aromatic oil is recovered from the sludge in numerous ways known to the art, one of which is the well known method of steam distillation, where the sludge is charged in a retort or still of acid resisting material. The retort or still is connected to a suitable condenser and superheated steam is introduced into the body of the sludge and causes a breaking up of the sulfuric compounds, whereby aromatic oil is set free and passes out of the still or retort with other gases and vapors through said condenser, at which condenser, aromatic oil and water are condensed and allowed to run into a suitable receiving container in which said aromatic oil and water separate into two layers. The water being heavier settles to the bottom and is drawn off through the valve. The aromatic oil is usually treated with an alkali to remove any acid it may contain. Thus it will be seen that the aromatic unsaturated hydrocarbon oil which I use is obtained from acid sludges in the purifying treatment of distillates from crude mineral oil, particularly of the California asphaltic base variety. This aromatic unsaturated hydrocarbon oil is therefore of mineral origin and in the art at present is considered a waste oil, its only known use heretofore being for low grade fuel purposes.

In carrying out my invention I mix one gallon of aromatic unsaturated hydrocarbon oil with 8 ounces more or less of rubber gums or the like and heat or agitate the mixture until the gums are dissolved. This forms an oily mixture which constitutes an improved paint oil or coating.

By adding suitable proportions of white lead or paint pigments as desired I obtain a reliable, penetrating, preserving paint which is impervious to moisture. I have found that this oil will absorb approximately 16 lbs. of white lead to the gallon, this being substantially the same amount as absorbed by commercial linseed oil.

I may combine with this paint oil, suitable proportions of linseed oil, as desired, the oil being of such a nature that it will readily combine with the linseed oil and provide a clear oil free from sediment. By adding a suitable proportion of asphaltum to the paint oil I provide a paint or coating which is particularly adapted for use upon iron or other metals.

It is to be understood that this invention contemplates the provision of the aromatic unsaturated hydrocarbon oil with rubber gums dissolved therein, as a commercial product for various coating and analogous uses, inasmuch as I believe I am first in the use of aromatic unsaturated hydrocarbon oil as a new solvent of rubber gums and the like, and in the application of this compound as a binder of white lead and other paint pigments for use in the arts as a substitute for linseed and other oils.

I claim:—

1. A paint oil comprising an aromatic unsaturated hydrocarbon oil obtained from petroleum sludge, and rubber gums in solution in said oil, substantially in the proportions specified.

2. A paint oil comprising a mineral hydrocarbon oil obtained from petroleum sludge and rubber gums in solution therein substantially in the proportions specified.

3. A paint comprising an aromatic unsaturated hydrocarbon oil obtained from petroleum sludge, rubber gums in solution in said oil, and paint pigments all substantially in the proportions specified.

4. A paint oil including in its composition rubber dissolved in an aromatic unsaturated hydrocarbon oil obtained from petroleum sludge.

5. A paint oil including in its composition rubber gums dissolved in an unsaturated hydrocarbon oil obtained from acid sludges derived in the purifying treatment of crude mineral oil distillates.

GEORGE I. ST. JOHN.